(12) United States Patent
Lauf et al.

(10) Patent No.: US 6,575,030 B1
(45) Date of Patent: Jun. 10, 2003

(54) BRAKE ROTOR MILL BALANCE CLAMPING APPARATUS

(75) Inventors: Randall Joseph Lauf, Belleville, IL (US); Clyde Elmer Bradford, St. Charles, MO (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 10/273,958

(22) Filed: Oct. 18, 2002

(51) Int. Cl.[7] .............................................. G01M 1/00
(52) U.S. Cl. ...................................................... 73/487
(58) Field of Search ............................ 73/487, 462, 66

(56) References Cited

U.S. PATENT DOCUMENTS

| | | | |
|---|---|---|---|
| 4,495,812 A | 1/1985 | Gorris | |
| 5,224,303 A | * 7/1993 | Baldwin | 451/365 |
| 6,067,857 A | 5/2000 | Cooper et al. | |
| 6,338,273 B1 | * 1/2002 | Warkotsch | 73/487 |

* cited by examiner

*Primary Examiner*—Helen Kwok
*Assistant Examiner*—Tamiko Bellamy
(74) *Attorney, Agent, or Firm*—Polster, Lieder, Woodruff & Lucchesi (57) ABSTRACT

A brake rotor clamping apparatus for use with a brake rotor balancing and milling apparatus, which is adjustable to a range of brake rotors having varied diameters and thickness. The brake rotor clamping apparatus includes a lower clamp pad mounting flange secured to a driven spindle. An adjustable set of clamp pads fitted with replaceable spacer elements are secured to the lower clamp pad mounting flange. Axially opposing the lower clamp pad mounting flange is an upper clamp pad mounting flange. A matching plurality of adjustable clamp pads fitted with spacer elements are secured to the upper clamp pad mounting flange, opposing the clamp pads on the lower clamp pad mounting flange, such that a brake rotor seated on a spring mounted centering cone is clamped between the opposing pairs of clamp pad segments.

15 Claims, 7 Drawing Sheets

BRAKE ROTOR MILL BALANCE
CLAMPING APPARATUS

CROSS-REFERENCE TO RELATED
APPLICATIONS

Not Applicable.

STATEMENT REGARDING FEDERALLY
SPONSORED RESEARCH

Not Applicable.

BACKGROUND OF THE INVENTION

The present invention relates generally to an apparatus for clamping a vehicle brake rotor having specific dimensions during a manufacturing process whereby the peripheral edges of the brake rotors are milled, and more specifically, to an improved clamping apparatus which is universally adjustable to clamp brake rotors of varying dimensions.

Figure 1:
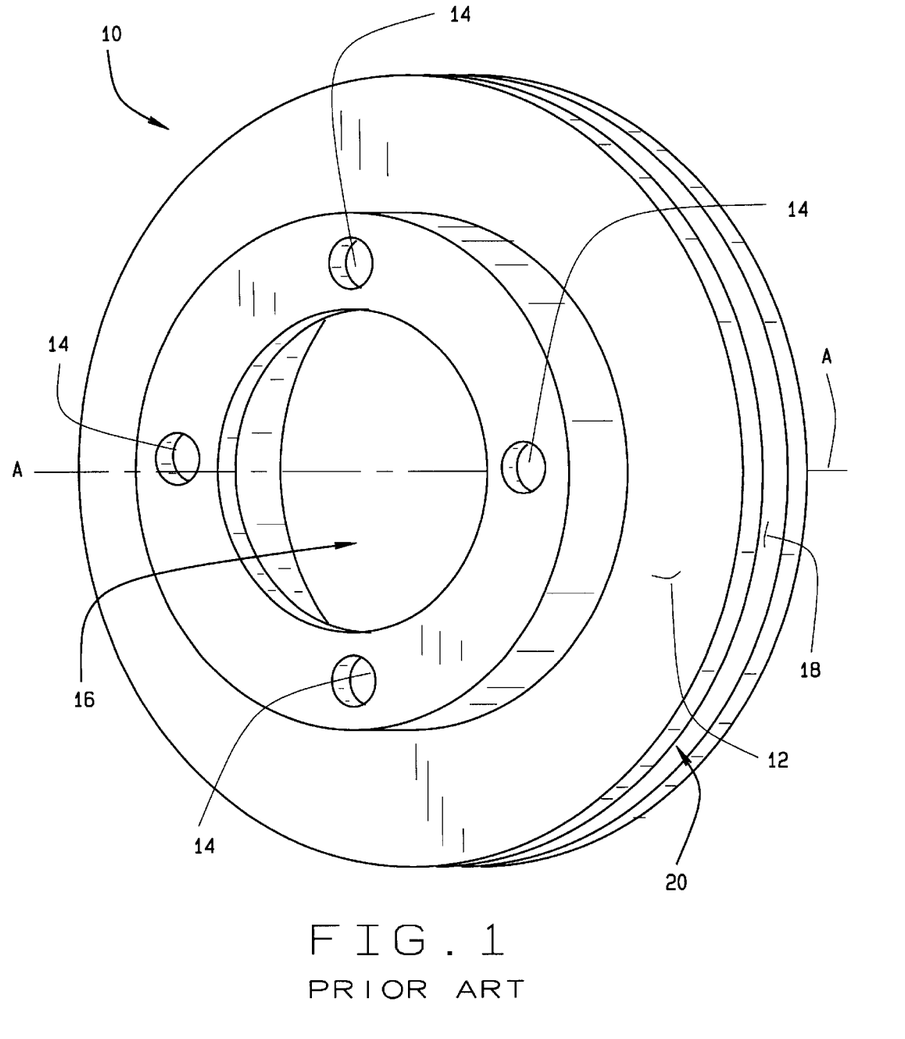
FIG. 1 is a perspective view of a conventional prior art brake rotor.

The manufacture of brake rotors for use in automotive vehicle applications begins with a rough casting of a metal brake rotor shown generally at 10 in FIG. 1. This rough casting is machined to provide the smooth friction surfaces 12 against which vehicle brake friction pads will clamp to generate a braking force. Additional machining operations drill suitable bores 14 into the brake rotor 10 through which wheel lugs or retaining bolts are passed to secure the brake rotor to a vehicle wheel assembly. A large diameter central axial bore 16 in the brake rotor is machined for mounting the brake rotor 10 onto a vehicle wheel assembly. Finally, the brake rotor 10 is rotationally balanced by milling or grinding material from the inner surfaces 18 of channel 20 in the peripheral edge of the brake rotor 10 to eliminate any static and dynamic imbalances present as the brake rotor rotates about the central axis A—A. Material is removed by the milling or grinding operation only from the inner surfaces 18 of channel 20 so as to maintain a uniformly circular perimeter on the smooth friction surface 12

Conventional milling or grinding apparatus, such as that sold by Balance Technology, Inc. of Ann Arbor, Mich., secure an individual brake rotor to be balanced using a pair of specifically sized annular clamp rings in combination with matching diameter annular spacer rings. To prevent damage to the brake rotor friction surface during the milling or grinding operations, the brake rotor must be secured by the clamp rings within a predetermined spacing from the peripheral edge of the brake rotor.

To set up a conventional milling or grinding apparatus, a lower clamp ring mounting flange, having an outer diameter suitable for use with the out diameter size of a brake rotor to be machined, is secured to the drive head or spindle of the milling or grinding apparatus. An annular spacer ring of suitable height and diameter is then secured thereto, concentric with the drive head or spindle, and an annular clamp ring having matching diameter is fastened to the annular spacer ring. Next, a centering cone suitably sized to engage the inner surfaces of the brake rotor central axial bore is fitted to a spring-mounted plunger shaft, coaxially disposed along the rotational axis of the drive head or spindle.

An upper clamp ring mounting flange of corresponding outer diameter is next secured to the milling or grinding apparatus, along with an upper annular spacer ring of suitable height and diameter, and an upper annular clamp ring, to form the upper clamping assembly. The entire upper clamping assembly is configured for movement along the rotational axis of apparatus to engage the upper surface of a brake rotor seated on the lower clamping assembly.

A brake rotor placed over the centering cone, supported by the spring plunger. The brake rotor s secured in place by an axial clamping force exerted through the upper clamping assembly, depressing the centering cone and spring plunger, and holding the brake rotor between the upper and lower annular clamp rings, adjacent the rotor peripheral edge. Once clamped in this manner, the brake rotor can be spun rotationally about the central axis to align a milling or grinding location with the milling or grinding head, and held in a secure manner for engagement with the milling or grinding head during removal of material from a peripheral edge.

As can be readily seen by those of ordinary skill in the art, the conventional milling and grinding apparatus for use with vehicle brake rotors is suited for high-volume production runs of identically sized brake rotors. Since the conventional milling and grinding apparatus requires removal and replacement of several clamping components to accommodate brake rotors of differing diameters or differing thickness, resetting of the conventional systems for low-volume or limited production runs of brake rotors having different outer diameters and thickness is a time-consuming process.

Furthermore, it will be appreciated that to accommodate brake rotors of different outer diameters and different thickness, suitable alternate components such as the annular clamp rings, flanges, and annular spacer rings, must be readily available. For example, to machine sixteen different brake rotors of four different diameters and four different thickness, requires four different lower flanges, sixteen different lower annular spacer rings, four different lower clamp rings, four different upper flanges, four different upper annular spacer rings, and four different upper clamp rings, each of which must be removed and replaced to accommodate a differently sized brake rotor.

Accordingly, there is a need in the vehicle brake manufacture industry for a brake rotor milling and grinding apparatus which can be readily reconfigured to accommodate a wide range of brake rotor sizes and thickness, without the need for a complete disassembly and an exchange of numerous components, thereby permitting rapid reconfiguring suitable for low-volume or highly variable brake rotor product lines.

BRIEF SUMMARY OF THE INVENTION

Briefly stated, the present invention provides a brake rotor clamping apparatus suitable for use with a brake rotor milling and grinding apparatus, and which is readily adjustable to a wide range of brake rotors having varied diameters and thickness. The brake rotor clamping apparatus includes a lower clamp pad mounting flange secured to a drive head or spindle on a drive shaft. A plurality of sets of attachment points are disposed in an upper surface of the lower clamp pad mounting flange at varying radial placements. A plurality of clamp pad segments fitted with replaceable spacer elements are secured to the lower clamp pad mounting flange by bolts threaded into one set of attachment points. The specific set of attachment points into which the clamp pad segments are disposed corresponds to the dimensions of the brake rotor to be machined. A centering cone for receiving the brake rotor is secured on a spring plunger concentrically mounted to the drive shaft, and concentric with the lower clamp pad mounting flange. Axially opposing the lower clamp pad mounting flange is an upper clamp pad mounting flange including a second plurality of sets of attachment points disposed at varying diameters. A matching plurality of clamp pad segments fitted with spacer elements are secured to the upper clamp pad mounting flange by bolts threaded into the one set of attachment points. The specific set of attachment points into which the upper clamp pad segments are disposed opposes the set of threaded bores into which the clamp pads on the lower clamp pad mounting flange are mounted, such that a brake rotor seated on the centering cone is clamped between the opposing pairs of clamp pad segments.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 2:
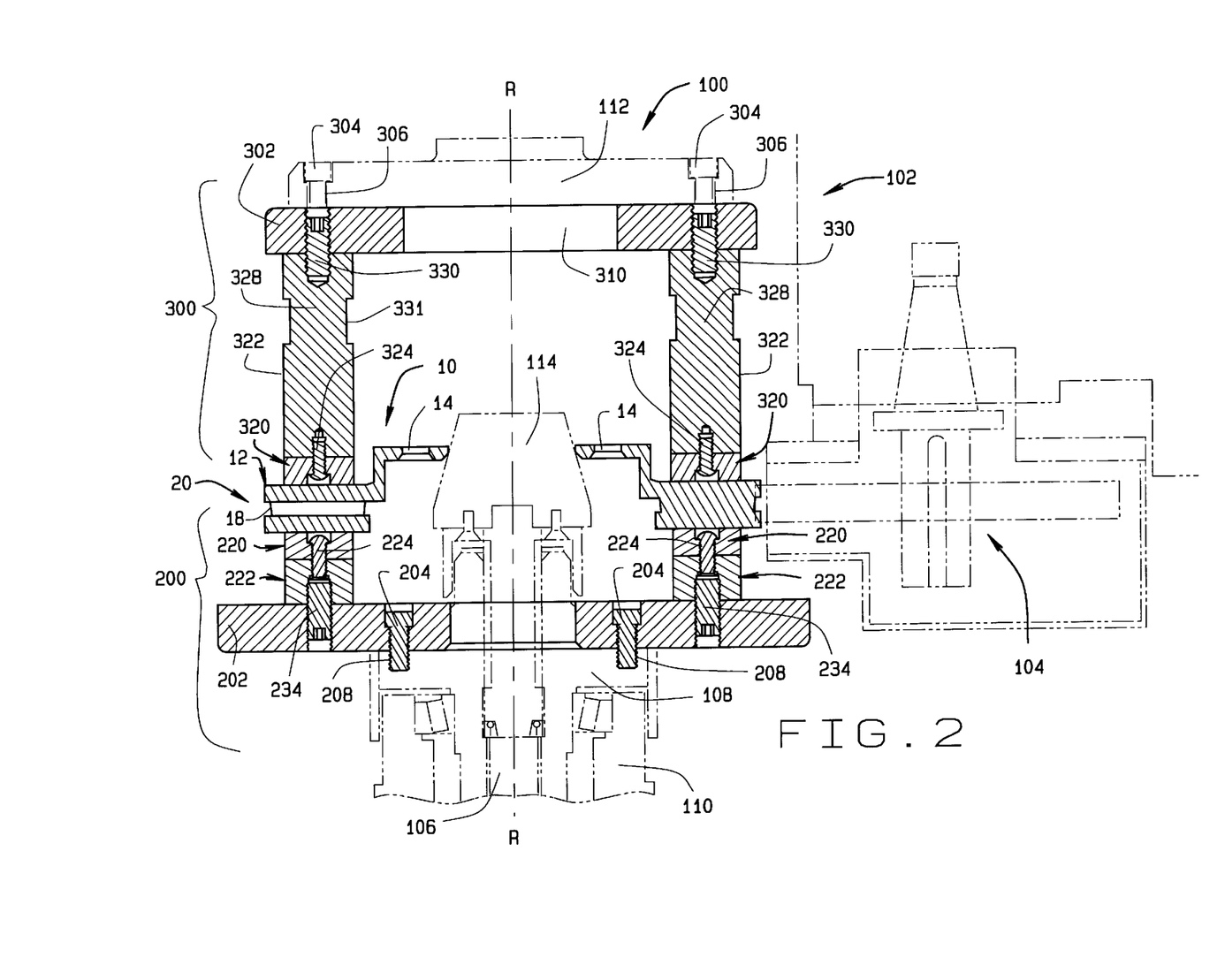
FIG. 2 is a partial sectional view of the clamp tooling assembly of the present invention.

Turning to FIG. 2, a sectional view of the clamping assembly 100 for use in a brake rotor milling and grinding apparatus 102 is shown. The conventional components of the brake rotor milling and grinding apparatus 102 are shown in phantom, and include a mill cutter 104 for removing material from a peripheral edge 18 of a brake rotor 10, a spring-mounted plunger shaft 106 having an axis of rotation R-R, a coaxially mounted driven head or spindle 108, commonly referred to as an orient spindle, driven by a drive shaft 110, an upper clamping face 112 configured for exerting an axial clamping force towards the driven head 108, and a coaxially mounted centering cone 114 for receiving brake rotor 10.

Figure 3A:
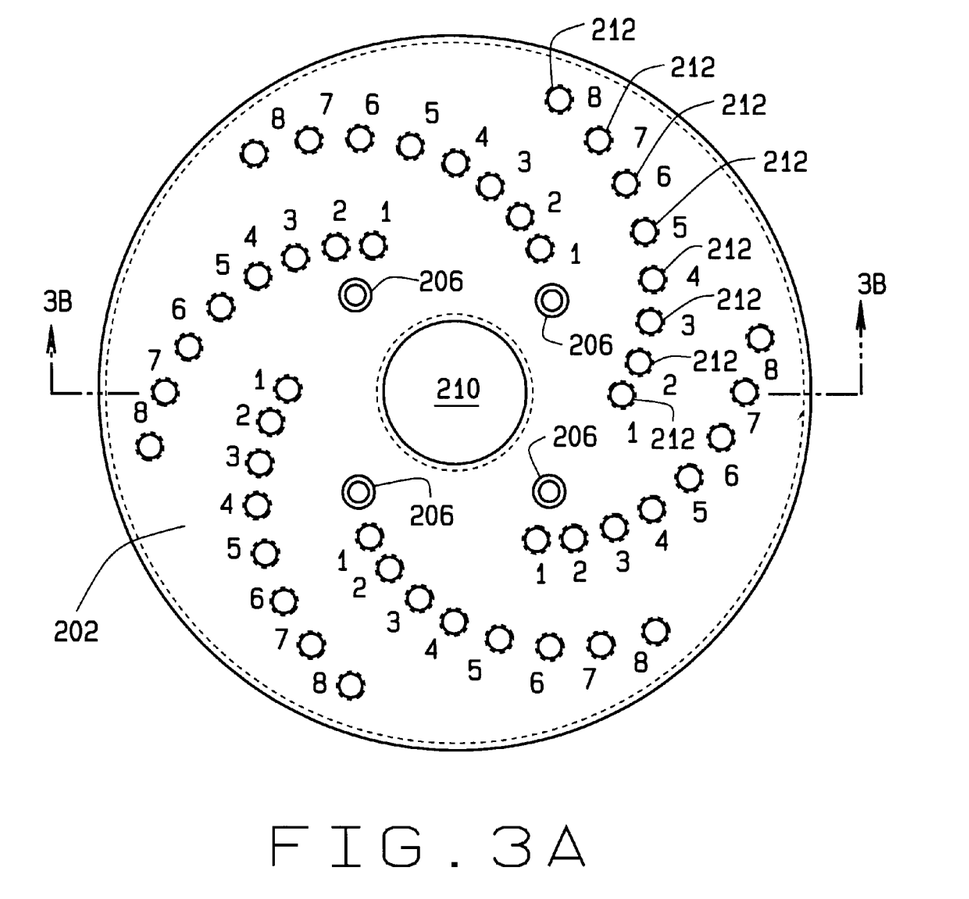
FIG. 3A is a top view of a lower clamp pad mounting flange.
Figure 3B:
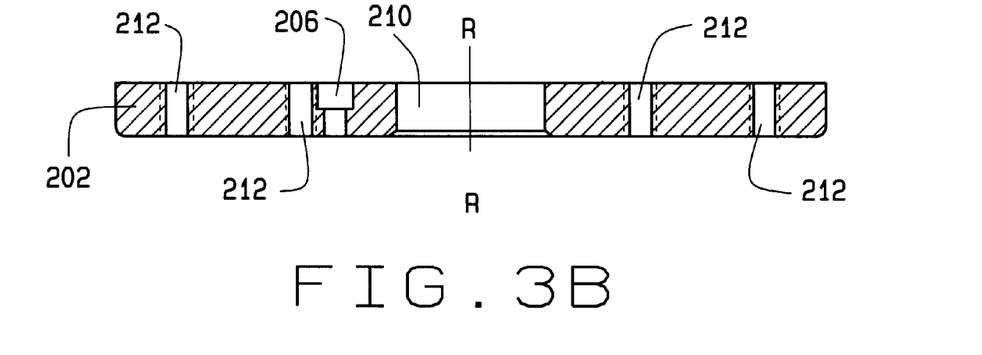
FIG. 3B is a sectional view of the lower clamp pad mounting flange of FIG. 3A, taken along line 3B—3B.

The components of clamping assembly 100 will be discussed below in two groups, the lower clamping components 200 and the upper clamping components 300. Turning first to lower clamping components 200, a lower mounting flange 202 shown in FIGS. 3A and 3B is secured to driven head 108 by machine screws or retaining bolts 204 passing through countersunk bores 206 and engaging tapped bores 208 in drive head 108. Lower mounting flange 202 is preferably plate-shaped, with a central bore 210 through which a portion of spring-mounted plunger shaft 106 passes.

Lower mounting flange 202 includes a number of attachment points, preferably tapped bores 212 arranged parallel to the axis of rotation R-R, in sets, and at varying radial positions about the axis of rotation R-R. Preferably, a total of eight sets of tapped bores 212 are formed in lower mounting flange 202. As seen in FIG. 3A, each tapped bore 212 included in a set is indicated by a corresponding reference mark 1, 2, 3, . . . 8, which is used to designate sets 1–8. Each set 1–8 preferably includes six tapped bores 212 spaced equidistantly about a fixed circumference, with each set 1–8 rotationally displaced from each adjacent set by a uniform arc. Those of ordinary skill in the art will recognize that the number of tapped bores 212 comprising each set 1–8, the number of sets, and the placement thereof, may be varied depending upon the particular application. Additionally, it will be recognized that tapped bores 212 may be replaced by T-slots, smooth bores, or other suitable means for retaining components in a fixed position relative to lower mounting flange 202.

Figure 4A:
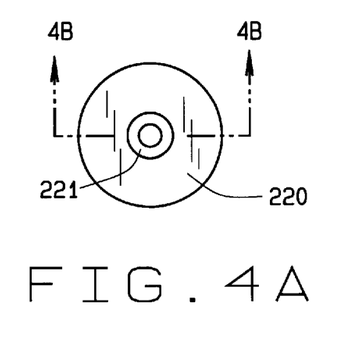
FIG. 4A is a top view of a clamp pad.
Figure 4B:
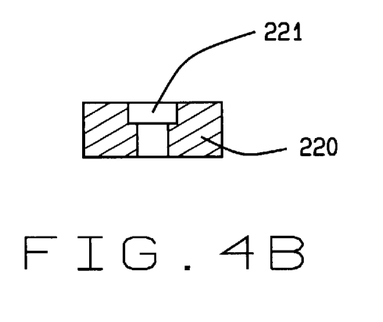
FIG. 4B is a sectional view of the clamp pad of FIG. 4A, taken along line 4B—4B.
Figure 5A:
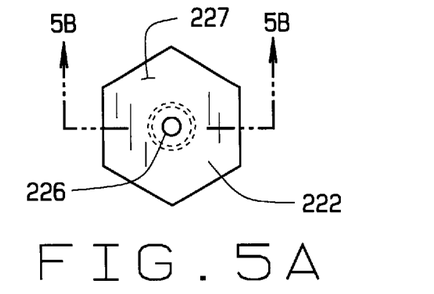
FIG. 5A is a top view of a lower clamp pad spacer assembly.
Figure 5B:
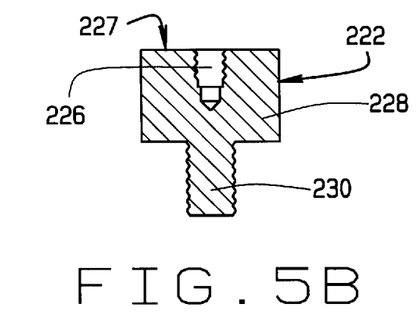
FIG. 5B is a sectional view of the lower clamp pad spacer assembly of FIG. 5A, taken along line 5B—5B.
Figure 5C:
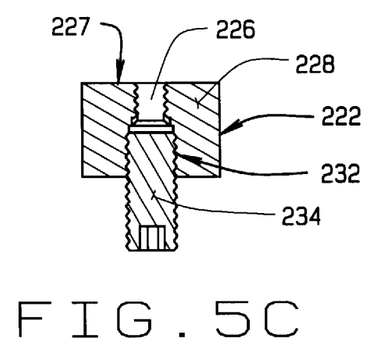
FIG. 5C is a sectional view of an alternative lower clamp pad spacer assembly, similar to FIG. 5B.

One set 1–8 of tapped bores 212 is utilized to retain a set of clamp pads 220, shown in FIGS. 4A and 4B, and associated spacer elements 222, shown in FIGS. 5A–5C. Each clamp pad 220 is preferably formed from a polyurethane material having a high frictional coefficient, is resilient to abrasion, ductile, and is softer than the material forming the brake rotor 10, so as not to damage or mar the surface thereof. Alternative materials having some or all of these characteristics, such as frictional clutch or brake lining material may be utilized. Each clamp pad 220 has a countersunk central bore 221 through which a threaded bolt or machine screw 224 is passed. Threaded bolt or machine screw 224 is threaded into a tapped axial bore 226 in an upper surface 227 of associated spacer element 222, securing clamp pad 220 to associated spacer element 222. Preferably, when used with a set 1–8 of tapped bores 212, each clamp pad 220 is identically sized to within a predetermined tolerance, as is each associated spacer element 222.

Each spacer element 222, shown in FIGS. 5A and 5B, includes a spacer body 228 and a threaded axial extension 230 opposite the axial bore 226, sized to seat in one of the tapped bores 212. Optionally, as shown in FIG. 5C, threaded axial extension 230 may be replaced by a threaded rod 234 seated in a tapped axial bore 232. Spacer body 228 is adapted for gripping by a conventional tool such as a wrench (not shown), permitting the threaded connection between threaded axial extension 230, or threaded rod 234, and tapped bore 212 to be tightened or loosened.

The height of spacer body 228 is selected to position peripheral edge 18 of brake rotor 10, seated on clamp pads 220 and fitted to centering cone 114, in the cutting plane of mill cutter 104 when clamped by the upper clamping components 300. In the preferred embodiment, the centering cone 114 is axially displaced $\frac{5}{8}^{th}$'s of an inch during the clamping process, and hence the height of each spacer body 228 is selected to position associated lower clamp pad 220 at $\frac{5}{8}^{th}$'s of an inch below the lower brake surface of brake rotor 10 prior to application of a clamping force from upper clamping components 300.

Those of ordinary skill in the art will recognize that the height of all spacer bodies 228 secured in a set of tapped bores 212 must be identical within a predetermined tolerance, and altering the axial position of peripheral edge 18 of brake rotor 10, requires spacer bodies 228 of a first height to be replaced by spacer bodies 228 of a second height.

Figure 6A:
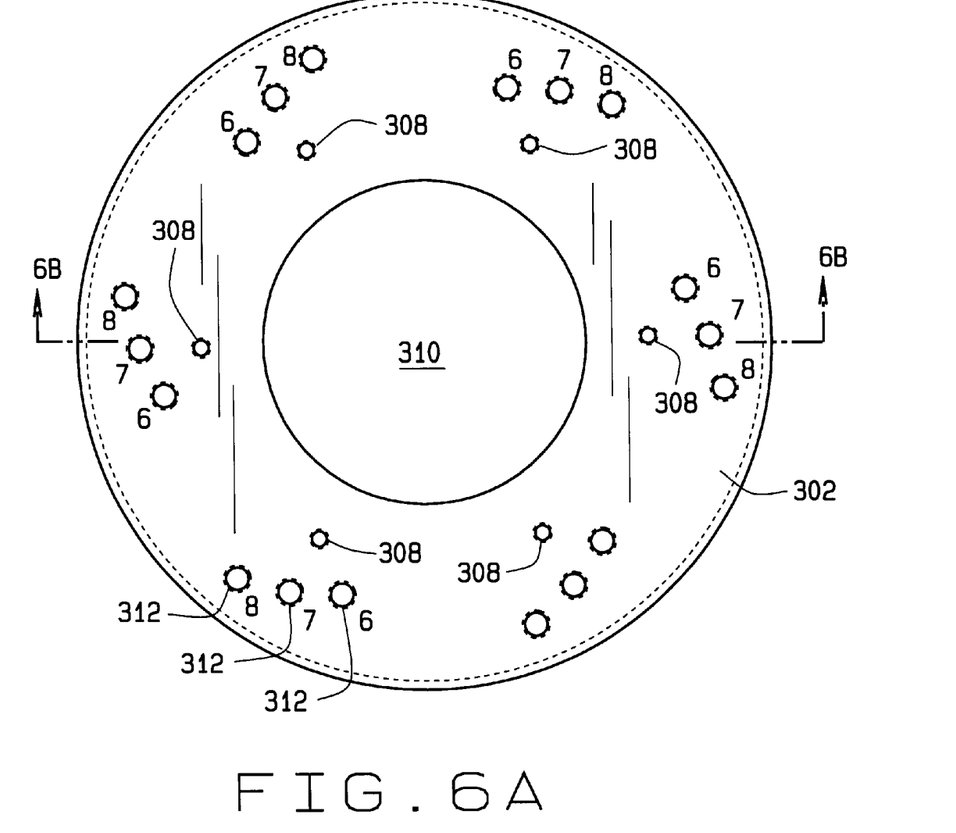
FIG. 6A is a top view of a large upper clamp pad mounting flange.
Figure 6B:
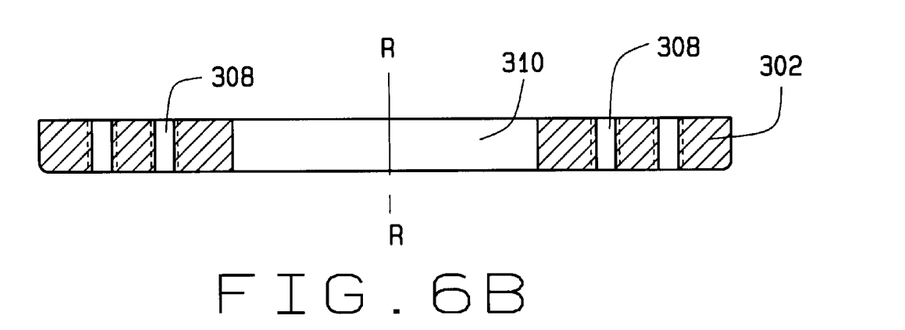
FIG. 6B is a sectional view of the larger upper clamp pad mounting flange of FIG. 6A, taken along line 6B—6B.

Turning next to the upper clamping components 300, an upper clamp pad backup plate adaptor 302 shown in FIGS. 6A and 6B is secured to upper clamping face 112 coaxial with axis of rotation R-R. Upper clamp pad backup plate adaptor 302 is secured by machine screws or retaining bolts 304 passing through countersunk bores 306 in upper clamping face 112 and engaging tapped bores 308 in upper clamp pad backup plate adaptor 302. Upper clamp pad backup plate adaptor 302 is preferably plate-shaped, with a central bore 310.

Upper clamp pad backup plate adaptor 302 includes a number attachment points 312, preferably tapped bores arranged parallel to the axis of rotation R-R, in sets, and at varying radial positions about the axis of rotation R-R. Alternatively, the tapped bores 312 may be replaced by T-slots, smooth bores, or other suitable means for the attachment of components to the upper clamp pad backup plate adaptor 302. As seen in FIG. 6A, each tapped bore 312 included in a set is indicated by a corresponding reference mark, for example 6, 7, or 8, which is used to designate sets of tapped bores 312 corresponding to sets of tapped bores 212 on lower mounting flange 202. Each set preferably includes six tapped bores 312 spaced equidistantly about a fixed circumference, with each set rotationally displaced from each adjacent set by a uniform arc. Each set of tapped bores 312 is in axial alignment with a correspondingly numbered set of tapped bores 212 on lower mounting flange 202.

Those of ordinary skill in the art will recognize that the number of tapped bores 312 comprising each set, the number of sets, and the placement thereof, may be varied depending upon the particular application.

Figure 7A:
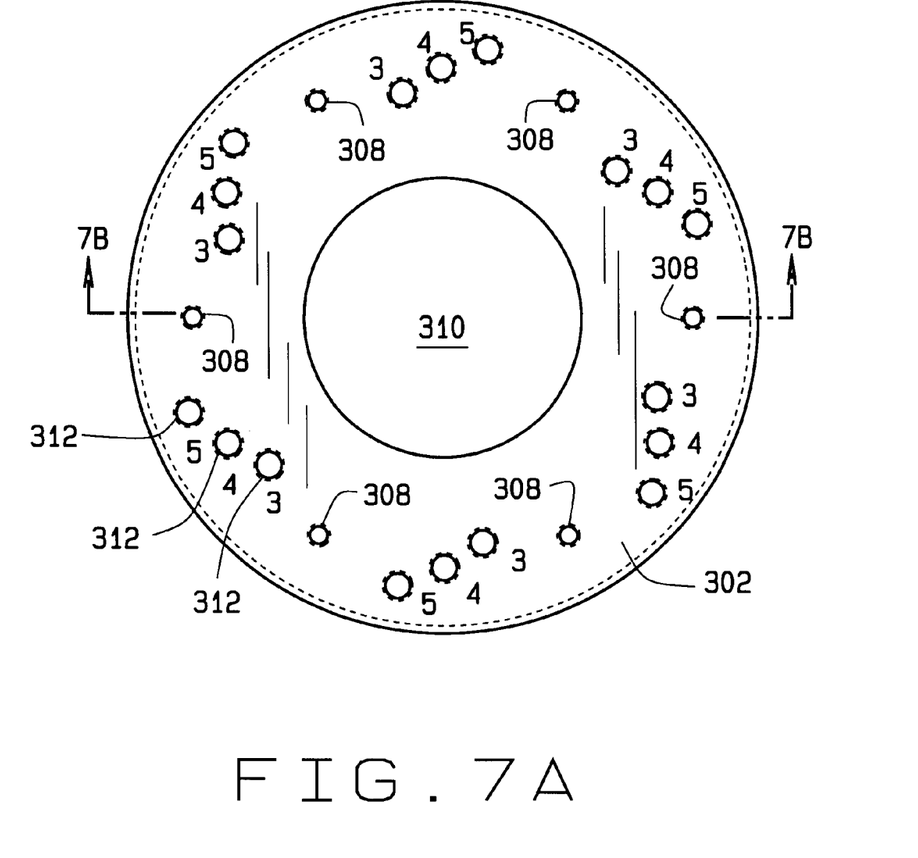
FIG. 7A is a top view of a medium upper clamp pad mounting flange.
Figure 7B:
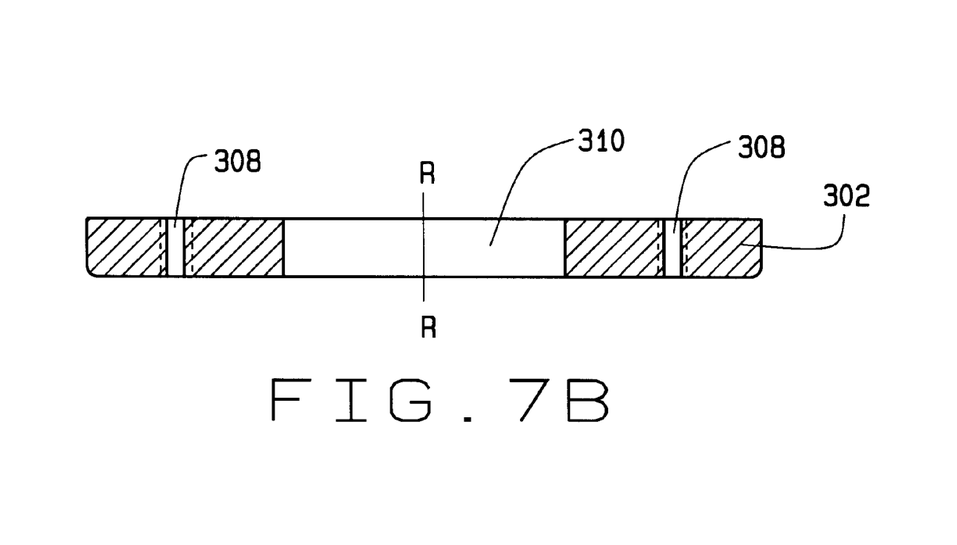
FIG. 7B is a sectional view of the medium upper clamp pad mounting flange of FIG. 7A, taken along line 7B—7B.
Figure 8A:
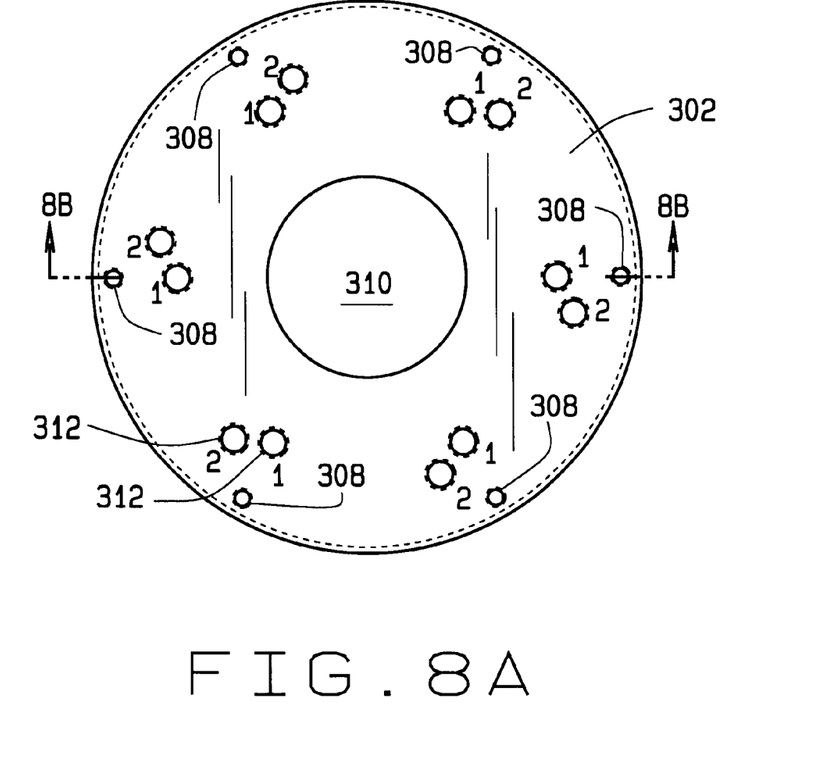
FIG. 8A is a top view of a small upper clamp pad mounting flange.
Figure 8B:
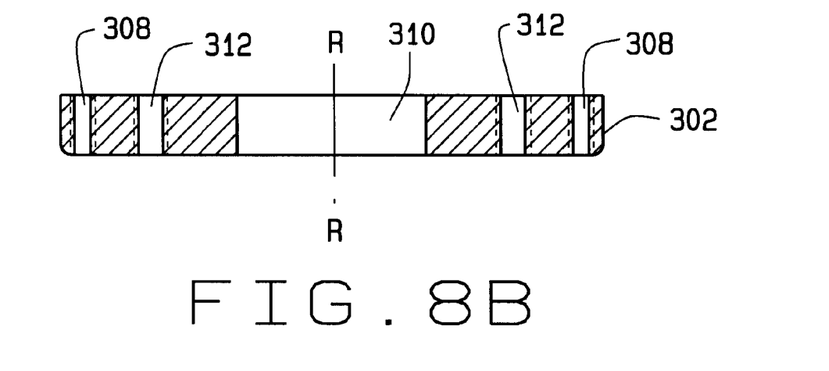
FIG. 8B is a sectional view of the small upper clamp pad mounting flange of FIG. 8A, taken along line 8B—8B.

For example, in one embodiment of the present invention, three upper clamp pad backup plate adaptors 302 of progressively smaller diameter are utilized to provide sets of tapped bores 312 corresponding to each of the sets of tapped bores 212 on lower mounting flange 202. A first plate adaptor, shown in FIGS. 6A and 6B and referred to as a "large" plate, provides sets 6–8 of tapped bores 312. A second plate adaptor of smaller diameter, shown in FIGS. 7A and 7B and referred to as a "medium" plate provides sets 3–5 of tapped bores 312, and a third plate adaptor of still smaller diameter, shown in FIGS. 8A and 8B and referred to as a "small" plate provides sets 1–2 of tapped bores 312.

Each "large", "medium" and "small" plate adaptor 308 is secured to upper clamping face 112 in the same manner.

In an alternate embodiment, a single upper clamp pad backup plate adaptor 302 is configured with sufficient tapped bores 312 to form a mirror-image of the arrangement of tapped bores 212 on lower mounting flange 202.

Figure 9A:
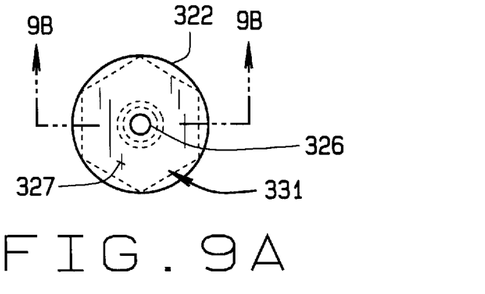
FIG. 9A is a top view of a upper clamp pad spacer assembly.
Figure 9B:
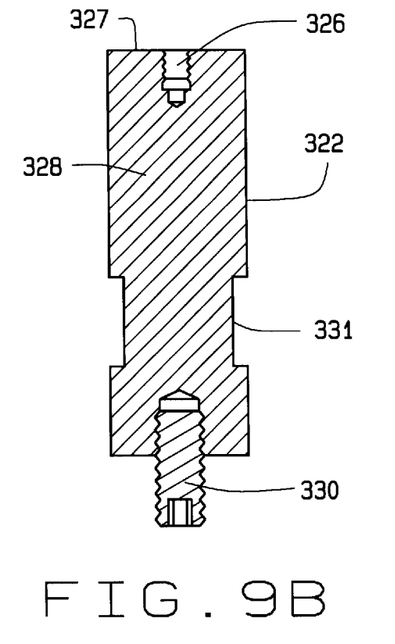
FIG. 9B is a sectional view of the upper clamp pad spacer assembly of FIG. 9A, taken along line 9B—9B.

One set of tapped bores 312 is utilized to retain a set of clamp pads 320, identical to clamp pads 220 shown in FIGS. 4A and 4B, and associated spacer elements 322, shown in FIGS. 9A–9B. Each clamp pad 320 is preferably formed from a polyurethane materials, and has a counter-sunk central bore through which a threaded bolt or machine screw 324 is passed. Threaded bolt or machine screw 324 is threaded into a tapped axial bore 326 in a lower surface 327 of associated spacer element 322, securing clamp pad 320 to spacer element 322. Preferably, when used with a set of tapped bores 312, each clamp pad 320 is identically sized to within a predetermined tolerance, as is each spacer element 322.

Each spacer element 322, shown in FIGS. 9A and 9B, includes a spacer body 328 and a threaded axial extension 330 opposite the axial bore 326, sized to seat in tapped bore 312. A portion 331 of spacer body 328 is adapted for gripping by a conventional tool such as a wrench (not shown), permitting the threaded connection between threaded axial extension 330 and tapped bore 312 to be tightened or loosened. The height of spacer body 328 is selected to contact clamp pads 320 with an upper surface of brake rotor 10 seated on clamp pads 220 and fitted to centering cone 114 when upper clamping face 112 is moved to exert an axial clamping force towards driven head 108. Those of ordinary skill in the art will recognize that the height of all spacer bodies 328 secured in a set of tapped bores 312 must be identical within a predetermined tolerance.

In the preferred embodiment, the selection of which set of tapped bores 212 on lower mounting flange 202, which plate adaptor 308, and which set of tapped bores 312 are to be utilized is based on the inner and outer diameter dimensions of a braking surface on brake rotor 10 to be machined. Table 1, set forth below is exemplary of the placement of tapped bores 212 defining sets 1–8 on a lower mounting flange 202 having an outer diameter of 13.00 inches about axis R-R. Matching sets of tapped bores 312 on plate adaptors 308 will have corresponding placements.

TABLE 1

| SET | PLACEMENT |
|---|---|
| Set #1 | 6 tapped bores equally spaced at a diameter of 6.250 inches about axis R-R |
| Set #2 | 6 tapped bores equally spaced at a diameter of 7.000 inches about axis R-R |
| Set #3 | 6 tapped bores equally spaced at a diameter of 7.750 inches about axis R-R |
| Set #4 | 6 tapped bores equally spaced at a diameter of 8.500 inches about axis R-R |
| Set #5 | 6 tapped bores equally spaced at a diameter of 9.250 inches about axis R-R |
| Set #6 | 6 tapped bores equally spaced at a diameter of 10.000 inches about axis R-R |
| Set #7 | 6 tapped bores equally spaced at a diameter of 10.750 inches about axis R-R |
| Set #8 | 6 tapped bores equally spaced at a diameter of 11.500 inches about axis R-R |

Associated Table 2, set forth below, sets forth an exemplary guide for which set of tapped bores 212 should be utilized for clamping a brake rotor 10 undergoing a balancing and milling operation, based upon the dimensions of the brake surface inner and outer diameters.

TABLE 2

| MAX BRAKE SURFACE INNER DIAMETER | MINIMUM BRAKE SURFACE OUTER DIAMETER | SET PATTERN NO. |
| --- | --- | --- |
| 4.625" | 7.750" | 1 |
| 5.375" | 8.500" | 2 |
| 6.125" | 9.250" | 3 |
| 6.875" | 10.000" | 4 |
| 7.625" | 10.750" | 5 |
| 8.375" | 11.500" | 6 |
| 9.125" | 12.250" | 7 |
| 9.875" | 13.000" | 8 |

Those of ordinary skill in the art will recognize the placement of attachment points 212 and 312 on respective lower mounting flange 202 and plate adaptor 308 may be varied based on the dimensions of the flange 202 and plate adaptor 308, the number of attachment points in each set, the number of sets, and the range sizes for brake rotors 10 to be balanced and milled.

In an alternate configuration, clamp pads 220 and 320 having a disk shaped configuration, as well as associated spacer elements 222 and 322 may be replaced by clamp pads having a configuration. For example, the surfaces of the clamp pads engaging brake rotor 10 may be faceted, such as squares, rectangles, or polygons, or may be arcuate segments. Those of ordinary skill in the art will recognize that the number of clamp pads utilized may be varied from the preferred amount, depending upon the configuration thereof, and that associated spacer elements 222 and 322 must have a cross-sectional area conforming to the configuration of the clamp pads to provide uniform support thereto.

To assemble clamping assembly 100 in a brake rotor milling and grinding apparatus 102, as shown in FIG. 2, lower mounting flange 202 is first secured to driven head or spindle 108 coaxial with axis R-R by machine screws or retaining bolts 204 passing through countersunk bores 206 and engaging tapped bores 208. Next, a set of clamp pads 220 and associated spacer elements 222 are selected based on the dimensions of brake rotor 10 to be balanced and milled. Clamp pads 220 and associated spacer elements 222 are secured together by use of threaded bolt or machine screw 224. The combined clamp pads 220 and associated spacer elements 222 are then threaded into each tapped bore 212 in a selected set in lower mounting flange 202. The specific set of tapped bores 212 selected is based on the dimensions of brake rotor 10.

Upper clamp pad backup plate adaptor 302 is secured to upper clamping face 112 coaxial with axis R-R by machine screws or retaining bolts 304 passing through countersunk bores 306 in upper clamping face 112 and engaging tapped bores 308. A set of clamp pads 320 and associated spacer elements 322 are selected based on the dimensions of brake rotor 10 to be balanced and milled. Clamp pads 320 and associated spacer elements 322 are secured together by threaded bolt or machine screw 324 engaging tapped axial bore 326. The combined clamp pads 320 and associated spacer elements 322 are then threaded into each tapped bore 312 in a set in upper clamp pad backup plate adaptor 302. The specific set of tapped bores 312 corresponds to the set of tapped bores 212 previously selected, and is based on the dimensions of brake rotor 10.

During operation, brake rotor 10 is seated on centering cone 114, supported on spring plunger 106. The brake rotor 10 is then clamped between clamp pads 220 and 320 by axial movement of upper clamping face 112 along axis R-R, which depresses the centering cone 114 and the spring plunger 106, bringing the brake rotor 10 into contact with clamp pads 220.

To change the clamping assembly 100 for use with a brake rotor 10 having a different diameter, but the same thickness, clamp pads 220 and 320, along with the associated spacer elements, are merely unthreaded from the tapped bores in the current set, and re-threaded into a new set of tapped bores suitably spaced to correspond to the next brake rotor diameter. No replacement of components is required to accommodate brake rotors of different diameters.

To change the clamping assembly 100 for use with a brake rotor 10 having a different thickness, but the same diameter, clamps pads 220 and 320, along with the associated spacer elements are unthreaded from the tapped bores in the current set. The associated spacer elements 222 are replaced by a new set of clamp pads and associated spacer elements selected based on the thickness of the new brake rotor 10. The clamp pads and associated spacer elements are re-threaded into either the same set of tapped bores, or in the case of a variation in brake rotor diameter, into a new set of tapped bores. Since the clamp pads are reused, only the associated spacer elements must be replaced to accommodate brake rotors of different thickness.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. In a brake rotor balancing system including a drive shaft having a rotational axis, an axially disposed clamping structure, and a radially disposed mill cutter, an improvement comprising:

a lower clamp pad mounting flange secured concentrically to the drive shaft, said lower clamp pad mounting flange including a first plurality of radially disposed sets of attachment points;

a first plurality of clamp pads detachably disposed equidistantly about an upper surface of said lower clamp pad mounting flange, each of said first plurality of clamp pads secured to said lower clamp pad mounting flange at an attachment point in one of said first plurality of radially disposed sets of attachment points;

an upper clamp pad backup plate adaptor secured to the axially disposed clamping structure, opposing said lower clamp pad mounting flange, said upper clamp pad backup plate adaptor including a second plurality of radially disposed sets of attachment points; and a second plurality of clamp pads detachably disposed equidistantly about a lower surface of said upper clamp pad backup plate adaptor, each of said second plurality of clamp pads secured to said upper clamp pad backup plate adaptor at an attachment point in one of said second plurality of radially disposed sets of attachment points.

2. The improved brake rotor balancing system of claim 1 further including a plurality of upper clamp pad spacers, said plurality of upper clamp pad spacers disposed between said second plurality of clamp pads and said lower surface of said upper clamp pad backup plate adaptor.

3. The improved brake rotor balancing system of claim 1 further including a plurality of lower clamp pad spacers, said plurality of lower clamp pad spacers disposed between said first plurality of clamp pads and said upper surface of said lower clamp pad mounting flange.

4. The improved brake rotor balancing system of claim 1 further including said first plurality of clamp pads and said second plurality of clamp pads aligned in opposition.

5. The improved brake rotor balancing system of claim 1 further including each set of attachment points comprising said first plurality of radially disposed sets of attachment points having a unique radial position about said rotational axis.

6. The improved brake rotor balancing system of claim 5 wherein each set of attachment points comprising said plurality of radially disposed sets of attachment points includes a plurality of attachment points equidistantly disposed about said rotational axis.

7. The improved brake rotor balancing system of claim 1 further including each set of attachment points comprising said second plurality of radially disposed sets of attachment points having a unique radial position about said rotational axis.

8. The improved brake rotor balancing system of claim 7 wherein each set of attachment points comprising said second plurality of radially disposed sets of attachment points includes a plurality of attachment points equidistantly disposed about said rotational axis.

9. The improved brake rotor balancing system of claim 1 wherein said first plurality of clamp pads and said second plurality of clamp pads are identical.

10. The improved brake rotor balancing system of claim 1 wherein each of said first plurality of clamp pads and each of said second plurality of clamp pads have a circular face.

11. The improved brake rotor balancing system of claim 1 wherein each of said first plurality of clamp pads and each of said second plurality of clamp pads have a arcuate face.

12. The improved brake rotor balancing system of claim 1 wherein each of said attachment points comprising said first plurality of radially disposed sets of attachment points and said second plurality of radially disposed sets of attachment points is a threaded bore.

13. The improved brake rotor balancing system of claim 1 wherein each clamp pad comprising said first plurality of clamp pads and said second plurality of clamp pads is composed of polyurethane.

14. The improved brake rotor balancing system of claim 1 wherein each clamp pad comprising said first plurality of clamp pads and said second plurality of clamp pads is composed of a brake friction material.

15. In a brake rotor balancing system including a drive shaft having a rotational axis, a driven head coupled to the drive shaft, an axially disposed clamping structure, and a radially disposed mill cutter, an improvement comprising:

a lower clamp pad mounting flange secured concentrically to the driven head, said lower clamp pad mounting flange including a first plurality of radially disposed sets of threaded bores;

a first plurality of polyurethane clamp pads detachably disposed equidistantly about an upper surface of said lower clamp pad mounting flange, each of said first plurality of clamp pads secured to an associated spacer element affixed to said lower clamp pad mounting flange at an threaded bore in one of said first plurality of radially disposed sets of threaded bores;

an upper clamp pad backup plate adaptor secured to the axially disposed clamping structure, opposing said lower clamp pad mounting flange, said upper clamp pad backup plate adaptor including a second plurality of radially disposed sets of threaded bores; and a second plurality of polyurethane clamp pads detachably disposed equidistantly about a lower surface of said upper clamp pad backup plate adaptor, each of said second plurality of clamp pads secured to an associated spacer element affixed to said upper clamp pad backup plate adaptor at a threaded bore in one of said second plurality of radially disposed sets of threaded bores.

\* \* \* \* \*